(12) United States Patent
Sugito et al.

(10) Patent No.: US 6,256,868 B1
(45) Date of Patent: Jul. 10, 2001

(54) ASSEMBLY PROCESS APPARATUS

(75) Inventors: Katsuhiko Sugito; Masakazu Watanabe, both of Nagoya; Kazunori Nakamura, Chiryu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/292,332

(22) Filed: Apr. 15, 1999

(30) Foreign Application Priority Data

Apr. 20, 1998 (JP) .................................................. 10-109429
Feb. 24, 1999 (JP) .................................................. 11-046453

(51) Int. Cl.⁷ .............................. B23P 21/00; B23Q 3/155
(52) U.S. Cl. ................................ 29/711; 29/714; 29/783; 29/784; 29/701; 483/15; 483/901
(58) Field of Search ........................... 29/711, 714, 742, 29/783, 784, 791, 795, 796, 701; 483/14, 15, 54, 901; 700/106, 112, 113, 247, 248

(56) References Cited

U.S. PATENT DOCUMENTS

| | | |
|---|---|---|
| 4,503,507 * | 3/1985 | Takeda et al. . |
| 4,503,596 * | 3/1985 | Ida et al. ................................ 483/15 |
| 4,577,284 | 3/1986 | Christy et al. . |
| 4,578,764 * | 3/1986 | Hutchins et al. . |
| 4,783,904 | 11/1988 | Kimura . |
| 4,809,425 | 3/1989 | Monforte . |
| 5,125,149 | 6/1992 | Inaba et al. . |
| 5,247,733 | 9/1993 | Kubota et al. . |
| 5,586,387 * | 12/1996 | Nakatani et al. ...................... 29/784 |
| 5,620,405 * | 4/1997 | Kamatani et al. ..................... 483/15 |

FOREIGN PATENT DOCUMENTS

| | | | |
|---|---|---|---|
| 59 115144 * | 7/1984 | (JP) ...................................... 483/901 |
| 60 127959 * | 7/1985 | (JP) ...................................... 483/15 |
| 63 191556 * | 8/1988 | (JP) ...................................... 29/701 |
| 8-197343 | 8/1996 | (JP) . |

* cited by examiner

Primary Examiner—S. Thomas Hughes
Assistant Examiner—Eric Compton
(74) Attorney, Agent, or Firm—Pillsbury Winthrop LLP

(57) ABSTRACT

An assembly process apparatus includes an assembly robot for assembling parts to a workpiece which is a main body, a part supply apparatus for supplying parts to the workpiece, a work pallet for supplying workpieces to an assembly station of the assembly robot, and a tool pallet for supplying assembly process modules interchangeable with respect to the assembly robot. The part supply apparatus is made up of a plurality of part supply modules interchangeable with respect to the assembly robot. With the assembly process apparatus as one unit, it is constructed to assemble parts one unit only or with a plurality of units combined. Accordingly, an assembly process apparatus achieves excellent productivity with which it is possible to expand or cut line equipments easily according to production volume, and it is possible to achieve utilization of surplus assembly robots.

7 Claims, 9 Drawing Sheets

ASSEMBLY PROCESS APPARATUS

CROSS REFERENCE TO RELATED APPLICATIONS

This application is based upon and claims priority from Japanese Patent Application Nos. H. 10-109429 filed Apr. 20, 1998, and H. 11-46453 filed Feb. 24, 1999, the contents of which are incorporated herein by reference.

BACKGROUND OF THE INVENTION

1. Field of the Invention

The present invention relates to an assembly process apparatus with which it is possible to change the equipment capacity of line equipment in correspondence with fluctuations of production volume of a product.

2. Description of Related Art

Conventionally, an assembly processed product is manufactured by a series of line equipments which successively assemble numerous steps consecutively.

Figure 14:
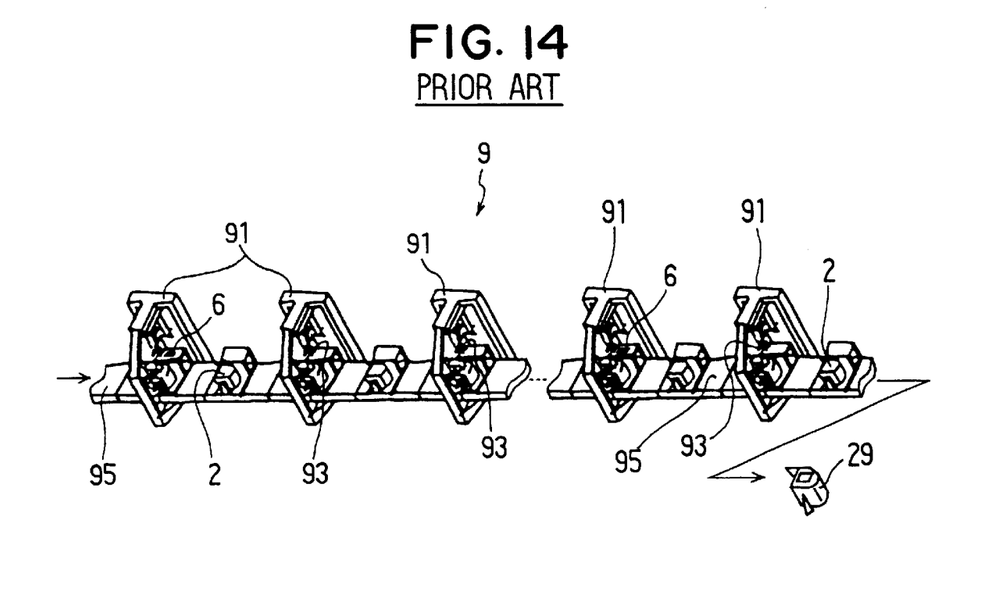
FIG. 14 is a perspective view of an assembly process apparatus according to a related art.

That is, as shown in FIG. 14, as the above-mentioned assembly process apparatus 9, for example, there is one consisting of ten assembly robots 91 disposed along a belt conveyor 95. The assembly robots 91 each have a tool 93 as an assembly process module corresponding to a step to be carried out.

The assembly robots 91 each grasp a part 6 with the tool 93 and assemble the part 6 to a workpiece 2 carried thereto on the belt conveyor 95. Then, the belt conveyor 95 carries the workpiece 2 with the part 6 assembled thereto to in front of the assembly robot 91 which will carry out the next step.

In this way, in the series of line equipments, successively, assembly and carrying are repeated, and when the assembly of the tenth assembly robot 91, which carries out a final step, finishes, one unit of a product 29 is completed.

The assembly process apparatus 9 described above, by carrying out a series of operations like this, provides a predetermined production volume.

However, in the conventional assembly process apparatus 9 described above, there are the following problems.

That is, the assembly process apparatus 9, by the time it completes the product 29, necessitates all of the above-mentioned ten assembly robots 91. Consequently, even when the production volume has decreased, the series of operations must be carried out using all of the ten assembly robots 91.

That is, in the assembly process apparatus 9, irrespective of the size of the production volume, to manufacture one product 29, all of the ten assembly robots 91 are necessary, and the equipments necessary for the manufacture of that product 29 are fixed.

On the other hand, in recent years, often the demand volume of a product is not constant, and fluctuates with for example model changes of the product.

Consequently, when the production volume is large, because the assembly process apparatus 9 is fully active, production efficiency is high. However, when the production volume decreases, the production efficiency falls, and the period for which the whole assembly process apparatus 9 is in an idle state becomes long. In this case, the operating efficiency of the assembly process apparatus 9 is low and consequently the production cost becomes high.

SUMMARY OF THE INVENTION

This invention was made in light of the foregoing problem, and it is an object of the present invention to provide an assembly process apparatus having excellent productivity with which it is possible to expand or cut line equipments easily in correspondence with the size of a production volume and it is possible to achieve utilization of surplus assembly robots.

According to an assembly process apparatus of the present invention, it includes an assembly robot for assembling a part to a workpiece; a part supply apparatus having a plurality of part supply modules which are interchangeable with respect to the assembly robot for supplying the part to the assembly robot; a work pallet for supplying the workpiece to the assembly robot; a plurality of assembly process modules which are interchangeable with respect to the assembly robot for assembling the part to the workpiece; and a tool pallet for supplying the plurality of assembly process modules to the assembly robot.

According to the assembly process apparatus of the present invention, with an assembly process apparatus constructed as described above as 1 unit, there is the case wherein parts are assembled with this 1 unit only, and the case wherein parts are assembled with a plurality of units combined.

In the case wherein parts are assembled with 1 unit only, from among the prepared part supply modules and assembly process modules, those necessary for that part assembly are allotted to one assembly robot.

On the other hand, in the case wherein parts are assembled with a plurality of units combined, from among the prepared part supply modules and assembly process modules, those necessary for that part assembly are divided up and allocated to the assembly robots.

Accordingly, different part supply modules can be interchanged freely with respect to a single assembly robot.

Also, when a plurality of units are used, different part supply modules can be interchanged freely with respect to a plurality of assembly robots. This is also the same for the assembly process modules.

Because of this, by changing the allocation of the part supply modules and the assembly process modules, it is possible to handle changes in the number of the assembly robots easily. Consequently, the number of units can be changed simply and freely.

Consequently, when the demand volume of a product is small, the number of units can be reduced to suppress production capacity, and when the demand volume of a product is large, the number of units can be increased to raise production capacity.

In this way, with the assembly process apparatus of the invention, by the above-mentioned 1 unit only or by a plurality of combined units being used, suitable production adjustment can be carried out.

Also, when the production volume is reduced, assembly process apparatuses becoming surplus, and the assembly robots therein, can be transferred to use in other equipment.

For this reason it is possible to expand or cut line equipments easily in correspondence with the size of a production volume, suitable running corresponding to production volume can be carried out, and production cost can be made low.

Thus, according to the present invention, it is possible to provide an assembly process apparatus having excellent productivity with which it is possible to expand or cut line equipments easily in correspondence with the size of a production volume and it is possible to achieve utilization of surplus assembly robots.

BRIEF DESCRIPTION OF THE DRAWINGS

Additional objects and advantages of the present invention will be appreciated, as well as methods of operation and the function of the related parts from a study of the following detailed description, the appended claims, and the drawings, all of which form a part of this application. In the drawings:

DETAILED DESCRIPTION OF THE PREFERRED EMBODIMENTS

Embodiments of the present invention will be described hereinafter with reference to the accompanying drawings.

First Embodiment

An assembly process apparatus of a first embodiment of the present invention will now be described with reference to FIG. 1 through FIG. 5.

As shown in FIG. 1 through FIG. 5, the assembly process apparatus 1 of the first embodiment has an assembly robot 11 for assembling parts to workpieces 2, which are main bodies, and a part supply apparatus 16 for supplying to the assembly robot 11 parts to be assembled by this assembly robot 11.

Figure 1:
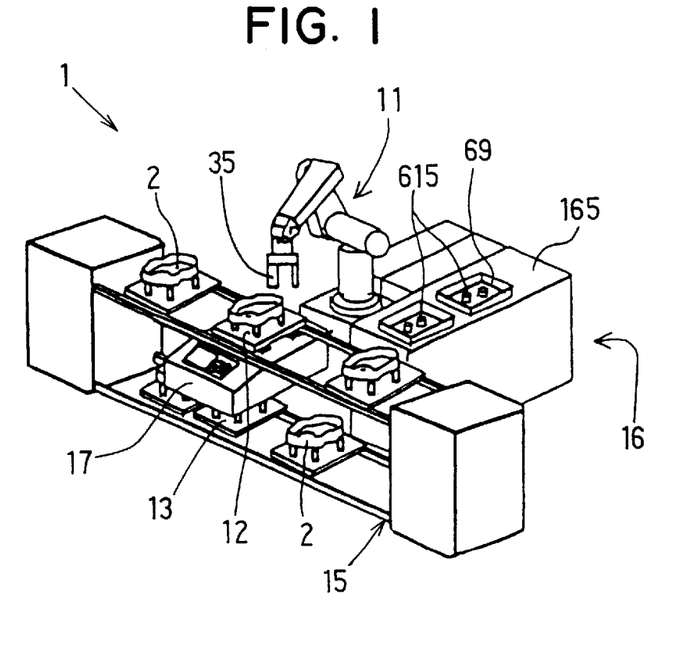
FIG. 1 is a schematic perspective illustration of an assembly process apparatus according to a first embodiment of the present invention.

Also, it has work pallets 12 for supplying the workpieces 2 to an assembly station 17 of the assembly robot 11, a tool pallet 13 for supplying a plurality of assembly process modules 35, 36 interchangeable with respect to the assembly robot 11, and a conveyor 15 for carrying the work pallets 12 to the assembly station 17.

Figure 2:
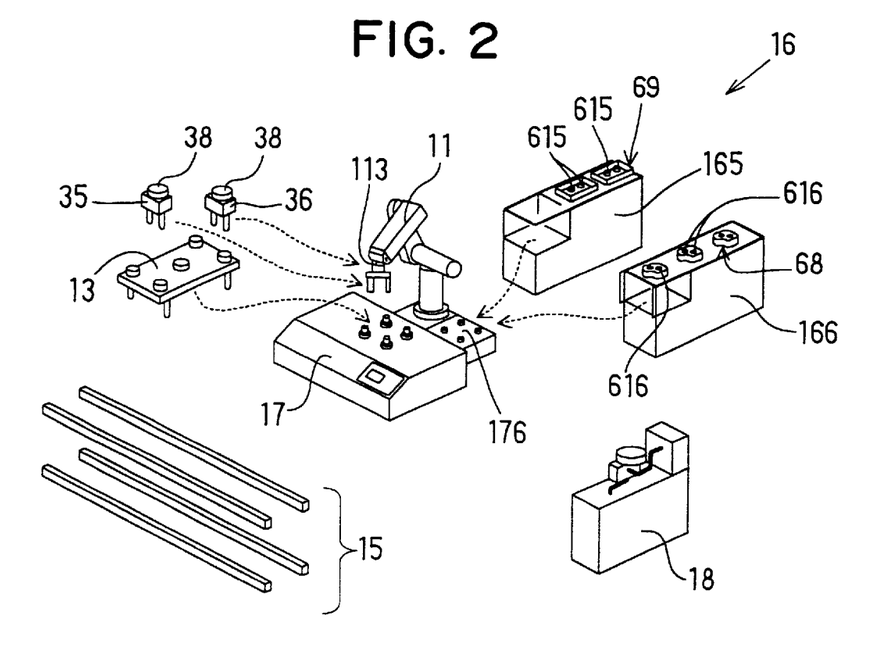
FIG. 2 is an exploded perspective view of the assembly process apparatus according to the first embodiment.

The part supply apparatus 16 is made up of a tray supply module 165 and a case supply module 166 constituting a plurality of part supply modules interchangeable with respect to the assembly robot 11 as shown in FIG. 2.

Figure 5A:
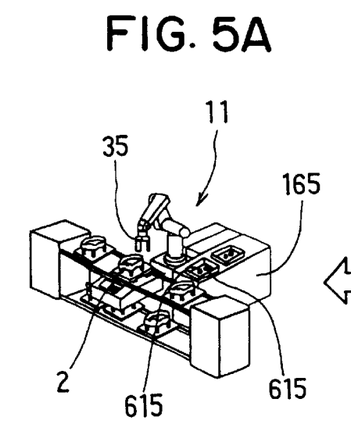
FIGS. 5A and 5B are perspective views illustrating a change in number of units according to the first embodiment.
Figure 5B:
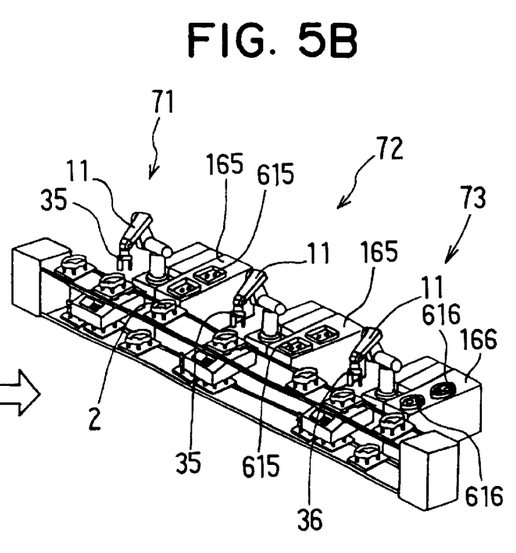

With the assembly process apparatus 1 described above as 1 unit, it is constructed to assemble parts with this 1 unit only or a plurality of units (a first unit 71, a second unit 72, a third unit 73) combined as shown in FIG. 5. The assembly robots 11 of all the units are of the same construction.

The assembly robot 11, as shown in FIG. 2, has an articulated arm and has at the distal end thereof a common attachment part 113 for any of the assembly process modules 35, 36 to be attached to.

For example one of the assembly process modules 35, 36 is a hand for gripping parts, and the other is a fixing tool such as a screwdriver for fixing parts.

Furthermore, the assembly process modules 35, 36 both have a standardized attaching part 38 for attaching to the assembly robot 11. And they are of a structure such that by this attaching part 38 being attached to the attachment part 113 of the assembly robot 11, as shown in FIG. 2, they are interchangeable with respect to the assembly robot 11.

Figure 3:
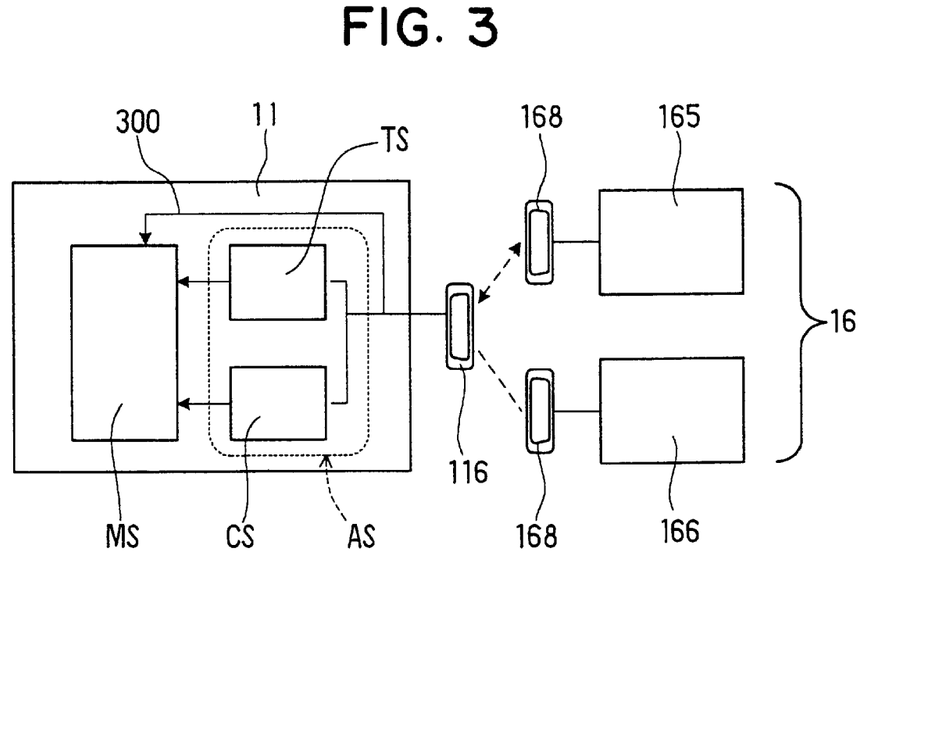
FIG. 3 is an explanatory illustration of a connection part between an assembly robot and part supply modules according to the first embodiment.

Also, the assembly robot 11, as shown in FIG. 3, has in the vicinity of the base end of the arm a common connection part 116 for either the tray supply module 165 or the case supply module 166 constituting the part supply modules to be connected to.

As shown in FIG. 2, the tray supply module 165 carries various parts 615 placed on trays 69, while the case supply module 166 carries various parts 616 placed on cases 68.

Figure 4A:
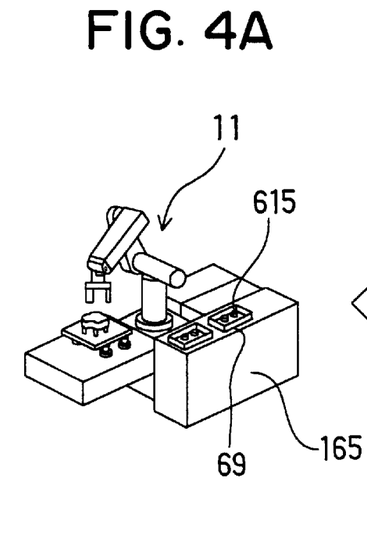
FIGS. 4A and 4B are perspective view illustrating interchanging of a part supply module according to the first embodiment.
Figure 4B:
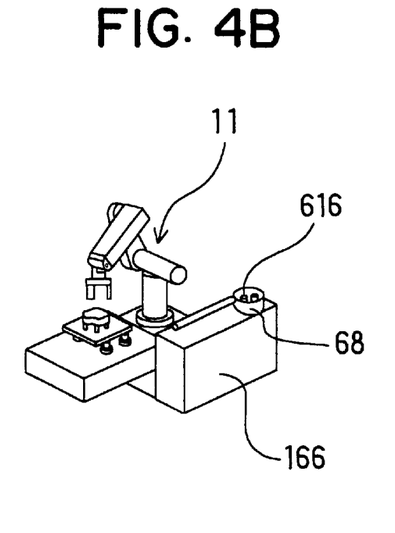

Also, as shown in FIG. 3, the tray supply module 165 and the case supply module 166 both have a standardized connecting part 168 for connecting to the assembly robot 11. By the connecting part 168 of either of the two being connected to the connection part 116 of the assembly robot 11, as shown in FIG. 4, the necessary tray supply module 165 or case supply module 166 is attached.

As shown in FIG. 3, the assembly robots 11 of the different units have operating software AS associated with each of the part supply modules in all-in-one form in advance. Specifically, the assembly robot 11 has main software MS, tray supply module operating software TS, and case supply module operating software CS.

Also, as shown in FIG. 3, the tray supply module 165 and the case supply module 166 are constructed so that they can start immediately on interchange by being connected with the connection part 116 of the assembly robot 11 (plug and play).

Specifically, when the connecting part 168 of a part supply module and the connection part 116 of the assembly robot are connected, first, the main software MS of the assembly robot detects a module type identification signal in a connection signal 300 and determines whether the connected part supply module is a tray supply module 165 or a case supply module 166. Then, the main software MS, on the basis of that determination result, automatically starts the operating software for the respective part supply module (the tray supply module operating software TS or the case supply module operating software CS).

As shown in FIG. 2, the assembly station 17 of the assembly robot 11 is a fixing stage for positioning the work pallet 12 carried thereto by the conveyor 15.

Also, like the assembly station 17, the assembly robot 11 is provided with a positioning part 176 for positioning the tray supply module 165 and the case supply module 166. An incidental work module 18 can be fixed to this positioning part 176 as necessary.

Operations and advantages of the first embodiment will now be described.

In the assembly process apparatus 1 of the first embodiment, with the assembly process apparatus constructed as described above as 1 unit, there are the case wherein parts are assembled with this 1 unit only as shown in FIG. 5A, and the case wherein parts are assembled with a plurality of units combined as shown in FIG. 5B.

First, when parts are assembled with 1 unit only, from among the prepared part supply modules and assembly process modules, those necessary for that part assembly are allocated to the one assembly robot.

That is, in the first embodiment, first, to the one assembly robot 11, the tray supply module 165 is connected and the assembly process module 35 is connected. As a result, the assembly robot 11 uses the assembly process module 35 to assemble to the workpieces 2 various parts 615 supplied to it by the tray supply module 165.

As the assembly process module 35, for example a hand for gripping parts and a screwdriver are used.

Then, until the assembly of a final part, in the one unit, assembly carried out by the assembly robot 11 is repeated, and assembly of parts is carried out.

When instead of the trays 69 various parts 616 are to be supplied by the cases 68, as shown in FIG. 4B, instead of the tray supply module 165 the case supply module 166 is connected to the assembly robot 11.

On the other hand, as shown in FIG. 5B, when assembly of parts is to be carried out with three units combined, from among the prepared part supply modules and the assembly process modules, the ones necessary for that part assembly are allocated to the three assembly robots 11.

That is, with respect to the assembly robots 11 of the first unit 71 and the second unit 72, first, the tray supply modules 165 are connected, and the assembly process modules 35 are attached. And with respect to the assembly robot 11 of the third unit 73, the case supply module 166 is connected and the assembly process module 36 is attached.

Then, in that state, the assembly robots 11 of the first unit 71, the second unit 72 and the third unit 73 successively assemble the various parts 615, 616 in the same way as that described above.

And until the assembly of a final part, in each unit, assembly carried out by the assembly robot 11 is repeated, and assembly of parts is carried out.

According to the first embodiment, not only it is possible to interchange the tray supply module 165 and the case supply module 166 freely with respect to a single assembly robot 11, but these can be interchanged freely with respect to a plurality of assembly robots 11. This is the same for the assembly process modules 35, 36 also.

Because of this, by changing the allocation of the tray supply module 165, the case supply module 166 and the assembly process modules 35, 36, it is possible to easily handle changes in the number of assembly robots 11. Consequently, the number of units can be changed simply and freely.

By this means, when the demand volume of a product is small, the number of units can be decreased to suppress production capacity as shown in FIG. 5A, and when the demand volume of a product is large, the number of units can be increased and the production capacity thereby raised as shown in FIG. 5B.

In this way, with the assembly process apparatus of the first embodiment, by using 1 unit only or a plurality of units combined, it is possible to carry out suitable production adjustment by changing the number of units according to the production volume.

Also, when the production volume is reduced, assembly process apparatuses having become surplus, and also the assembly robots therein, can be transferred to use in other equipment.

For this reason it is possible to expand or cut line equipments easily in correspondence with the size of a production volume, suitable running corresponding to production volume can be carried out, and production cost is reduced.

As shown in FIG. 2, FIG. 3, the connecting parts 168 of the assembly robots of the tray supply module 165 and the case supply module 166 are the same, and the attaching parts 38 to assembly robots of the assembly process modules 35, 36 are the same. Consequently, interchanging of part supply modules to the assembly robots 11 and interchanging of assembly process modules to the assembly robots 11 can be carried out rapidly.

By this means, not only changes of the number of units but also changes of part shapes arising from product changes can be handled easily.

Furthermore, as shown in FIG. 3, the part supply modules are constructed so that they can start immediately on interchange by being connected with the assembly robot 11. Consequently, there is no labor of restarting the assembly robot 11 and having the assembly robot 11 re-recognize the part supply module on every interchange, and it is possible to achieve shortening of line equipment reconstruction and reduction of reconstruction expenses.

The assembly robots 11 of the units have operating software AS associated with each of the part supply modules in all-in-one form in advance.

Consequently, an assembly robot 11, by automatically determining the type of a connected part supply module and then automatically starting the operating software of that part supply module, can operate the equipment immediately after the connection of the part supply module.

For this reason, even if the number of units is changed, by selecting operating software, without the operating software AS of the assembly robots 11 being rearranged every time, the assembly robots 11 can easily adapt.

Thus the assembly process apparatus can easily adapt to a change of number of units in the software aspect also. Consequently, it has the effect that expansion or reduction of line equipments can be carried out still more easily in correspondence with the size of a production volume.

Figure 15:
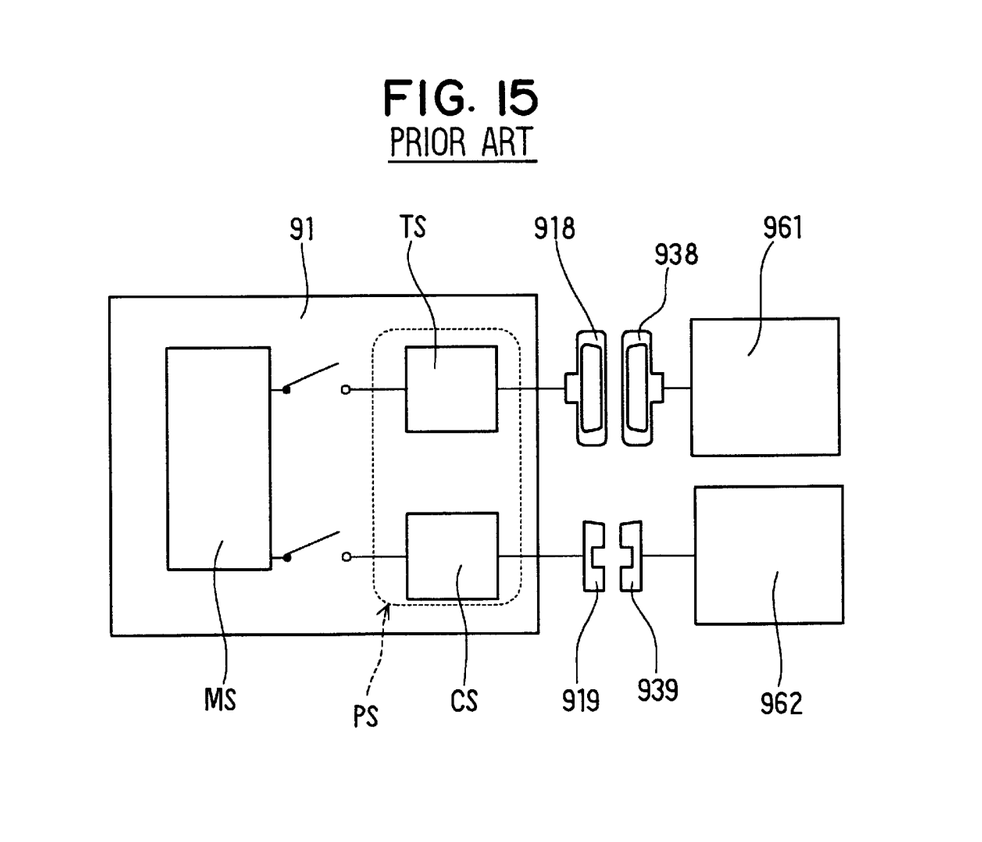
FIG. 15 is an explanatory illustration of connection parts between an assembly robot and part supply modules according to the related art.

According to the related art shown in FIG. 15, two types of part supply module 961, 962 have been interchanged. However, connecting parts 938, 939 to the assembly robot 91 are connectable only to the part supply module 961, 962 respectively. Consequently, on the assembly robot 91, exclusive connection parts 918, 919 corresponding to the connecting parts of the part supply modules become necessary. Also, respective software PS in individual form associated with each connecting part 918, 919 is necessary.

For this reason, there was labor of reconstruction in software and hardware aspects, such as for example having to rearrange individual form software PS corresponding to two types of part supply module into individual form software corresponding to five types of part supply module, or providing more connection parts on the assembly robot 91.

However, these problems in the related art are resolved by the first embodiment of the present invention as described above.

Second Embodiment

A second embodiment of the present invention will now be described with reference to FIG. 6 to FIG. 11. In this and the following embodiments, components which are substantially the same to those in previous embodiments are assigned the same reference numerals.

An assembly process apparatus 1 of the second embodiment, as shown in FIG. 6 through FIG. 11, has an assembly robot 11 for assembling parts 602 to 612 (FIG. 7) to workpieces 2, which are main bodies, and a part supply apparatus 16 for supplying to the assembly robot 11 the parts 602 to 612 to be assembled by this assembly robot 11.

It also has work pallets 12 for supplying the workpieces 2 to an assembly station 17 of the assembly robot 11, a tool pallet 13 for supplying a plurality of assembly process modules 31 to 33 (FIG. 11) interchangeable with respect to the assembly robot 11, and a conveyor 15 for circulating the work pallets 12 and the tool pallet 13 to the assembly station 17.

Figure 9:
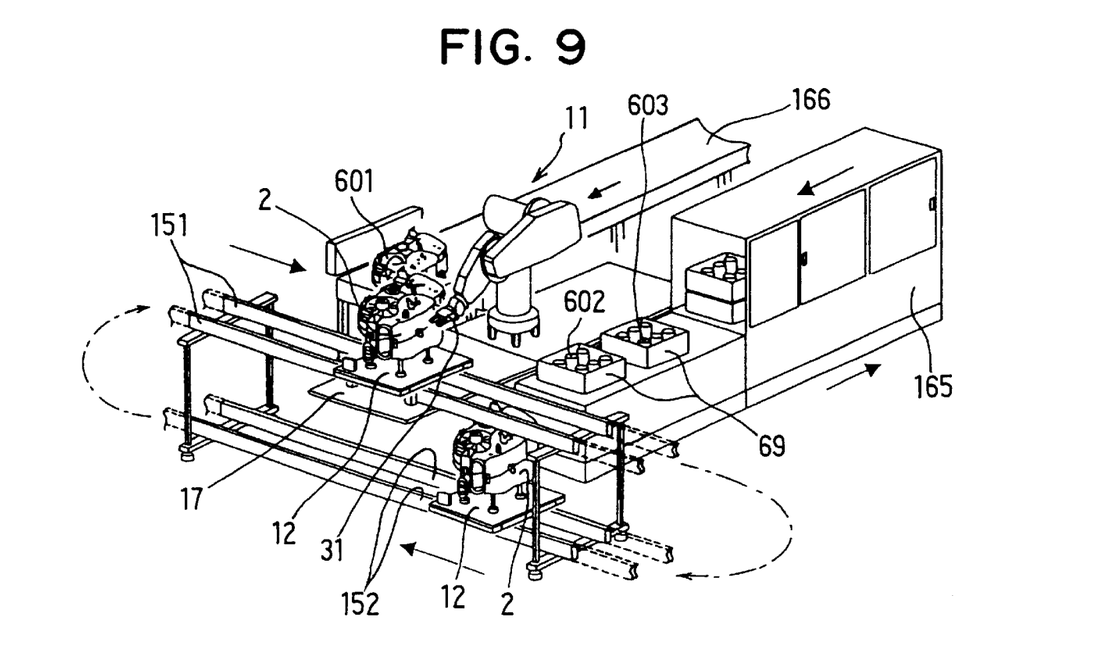
FIG. 9 is a perspective view illustrating a parts supply method according to the second embodiment of the present invention.

The part supply apparatus 16 is made up of a tray supply module 165 and a case supply module 166 constituting a plurality of part supply modules interchangeable with respect to the assembly robot 11 (FIG. 9).

It is constructed to successively assemble parts 602 to 612 to the workpieces 2, while circulating the work pallets 12 and the tool pallet 13 by means of the conveyor 15.

Figure 6:
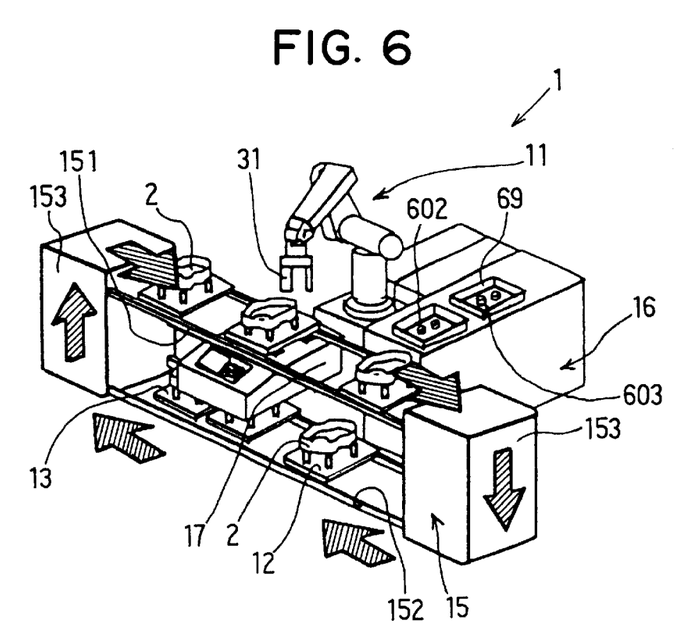
FIG. 6 is a schematic perspective illustration of an assembly process apparatus according to a second embodiment of the present invention.

The assembly robot 11, as shown in FIG. 6, has an articulated arm, and has at the distal end thereof an attachment part for the assembly process modules 31 to 33, and is disposed in the proximity of the conveyor 15.

The assembly station 17 of the assembly robot 11 is a fixing stage for positioning the work pallets 12 and the tool pallet 13 carried thereto by the conveyor 15.

As shown in FIG. 6, the conveyor 15 is a circulatory conveyor, and is made up of upper rails 151, lower rails 152, and lifters 153 connecting the upper rails 151 and the lower rails 152. The upper rails 151 and the lower rails 152 run between left and right lifters 153. The lifters 153 have lift plates (not shown) for the work pallets 12 and the tool pallet 13 to be placed on and move them up and down.

Below the two upper rails 151 of the conveyor 15, the assembly station 17 is disposed.

Also, as shown in FIG. 6, the tool pallet 13 is disposed so that it can run between the two upper rails 151 and between the two lower rails 152. And the work pallets 12 are lined up in a plurality behind the tool pallet 13, and are disposed in the same way as the tool pallet 13.

The work pallets 12 (FIG. 10) and the tool pallet 13 (FIG. 11) will be described in detail later.

The rest is the same as the first embodiment of the present invention.

Operations and advantages of the second embodiment will now be described.

In the assembly process apparatus 1 of the second embodiment, the tool pallet 13 is carried to the assembly station 17 of the assembly robot 11 by the conveyor 15 first. Then, an assembly process module 31 supplied by the tool pallet 13 is attached to the assembly robot 11.

Then, by the conveyor 15, a work pallet 12 is carried to the assembly station 17 of the assembly robot 11 after the tool pallet 13. The assembly robot 11 then uses the assembly process module 31 to grasp a lower case, which is a part 601 for a first step, and, first, places onto the work pallet 12 the lower case as a workpiece 2 to become a main body.

Next, when the tool pallet 13 makes one circuit and circulates back to the assembly robot 11 again, the assembly robot 11 exchanges the assembly process module 31 of the first step for an assembly process module 32 of a second step. The assembly robot 11 then uses the assembly process module 32 of the second step to take out a door, which is a part 602 for the second step, from the tray 69 on the tray supply module 165 serving as the part supply apparatus 16.

Next, the work pallet 12 circulates again to the assembly station 17 of the assembly robot 11. Accordingly, the assembly robot 11 assembles the door 602 to the workpiece 2 on the work pallet 12 using the assembly process module 32.

The assembly of the parts 602 to 612 is carried out on the workpieces 2 on all of the work pallets 12 carried to the assembly station 17 of the assembly robot 11 in the course of the tool pallet 13 making one circuit.

Figure 7:
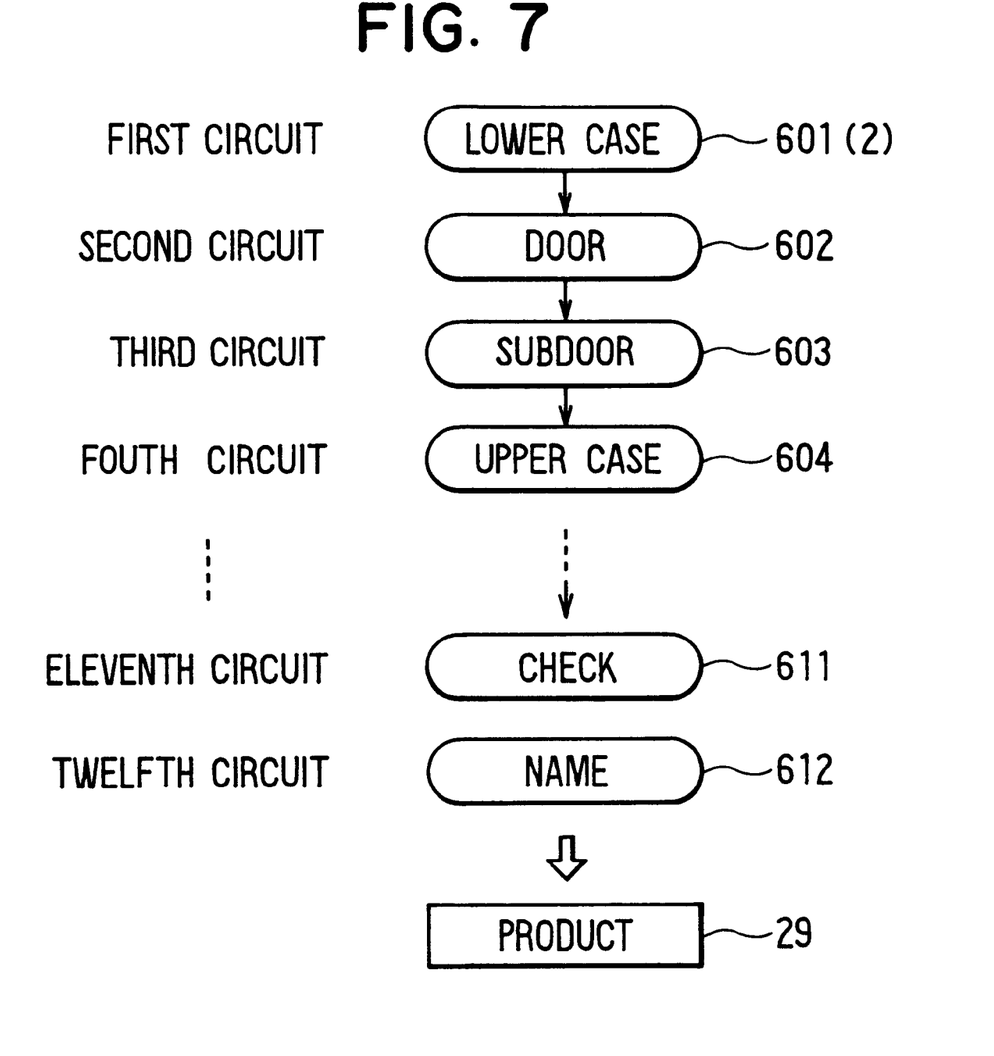
FIG. 7 is an explanatory illustration showing a circuit by circuit assembly sequence according to the second embodiment of the present invention.

Then, as shown in FIG. 7, until the assembly of name, which is the part 612 of a twelfth step, the circulatory carrying of the tool pallet 13 and the work pallets 12 and the assembly carried out by the assembly robot 11 are repeated, and, circuit by circuit, a subdoor, which is a part 603 of a third step, and an upper case, which is a part 604 of a fourth step, and so on are assembled.

Figure 8:
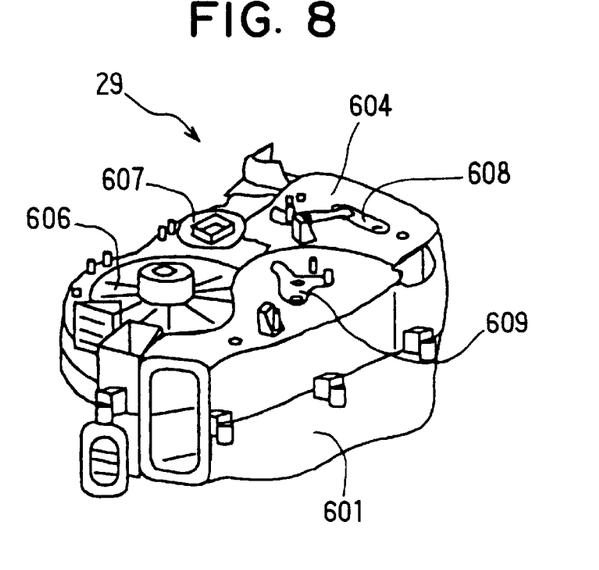
FIG. 8 is a perspective view of a product after assembly completion according to the second embodiment of the present invention.

In the above, while each work pallet 12 is making a circuit, the parts that can be assembled to the workpiece 2 on that work pallets 12 is one step s worth. By this means, the parts 602 to 612 are assembled to the workpieces 2, which is the above-mentioned parts 601, by the assembly robot 11 one step's worth at a time, and as shown in FIG. 8, multiple units of the product 29 are thereby completed.

Next, the supply method of the parts 602 to 612 will now be explained using FIG. 9.

Parts which, like the above-mentioned part 601 (the lower case), are large and cannot be received in the tray 69, are supplied by the case supply module 166 to a place reachable by the arm of the assembly robot 11.

On the other hand, small parts such as the part 602 (the door) are received on trays 69 type by type and, by a palletizer serving as the tray supply module 165, are supplied tray 69 by tray 69 to a place reachable by the arm of the assembly robot 11.

Figure 10:
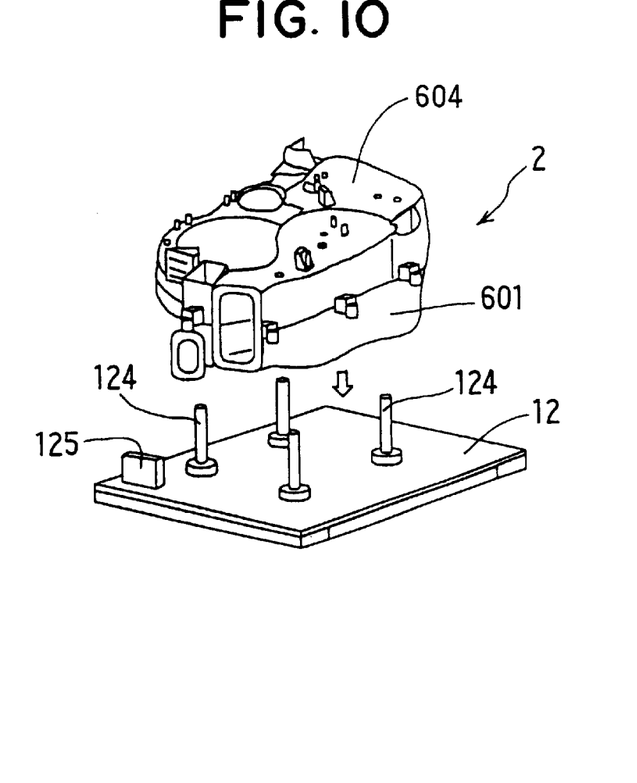
FIG. 10 is a perspective view of a work pallet before workpiece fixing according to the second embodiment of the present invention.

The work pallet 12, as shown in FIG. 10, is plate-shaped, and has supporting bars 124 on which a workpiece 2 is placed. Also, it has an assembly indicating device 125 for indicating to the assembly robot 11 what the part to be assembled to the workpiece 2 next is.

Figure 11:
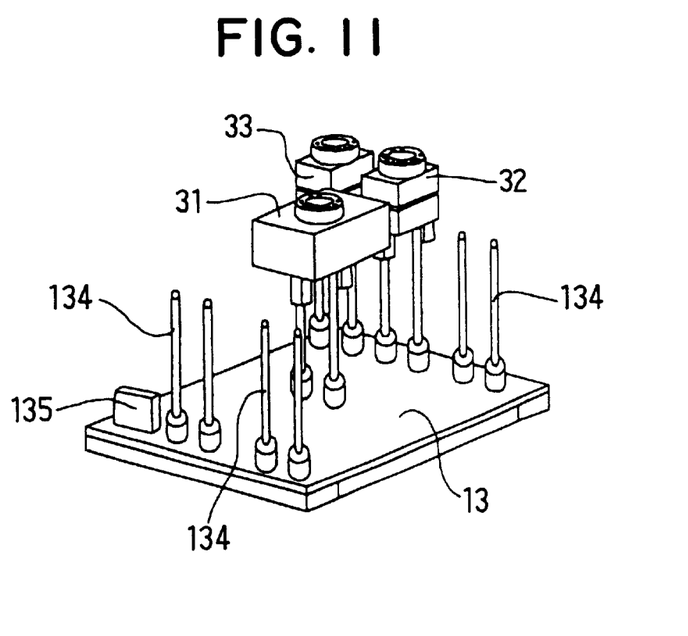
FIG. 11 is a perspective view of a tool pallet with an assembly process module placed according to the second embodiment.

The tool pallet 13, as shown in FIG. 11, is plate-shaped, and has supporting bars 134 on which the assembly process modules 31 to 33 are placed. It also has a counter device 135.

The assembly indicating device 125 and the counter device 135 are ID tags, and have the following functions.

That is, the number of circuits of the tool pallet 13 having the counter device 135 is counted by the lifters 153 of the conveyor 15, and the counted number of circuits is written in the counter device 135.

Then, on the basis of the number of circuits of that counter device 135, in the assembly indicating device 125 of the work pallet 12 carried thereto after the tool pallet 13, the part of which step it is to which the workpiece 2 on the work pallet 12 having that assembly indicating device 125 has had assembled thereto is written.

Then, on the basis of the record of the assembly indicating device 125, by way of a reading device (not shown), an assembly indication is given to the assembly robot 11 which is to carry out the next step.

According to the assembly process apparatus 1 of the second embodiment, the assembly robot 11 is made to perform twelve steps by circulating a plurality of work pallets 12 and a single tool pallet 13.

Furthermore, when the assembly process modules 31 to 33 have been attached to the assembly robot 11, they are used continuously as they are until the parts 602 to 612 finish being assembled to the workpieces 2 on the conveyor 15. That is, interchanging of the assembly process modules 31 to 33 is carried out when the tool pallet 13 is circulated to the assembly robot 11, and the number of interchanging is irrespective of the number of products 29 and is the same as the number of steps needed to complete one unit of the product 29.

For example, when there are six work pallets 12 on the conveyor 15 and the number of steps needed to complete the product 29 is twelve, the number of interchanges of the assembly process modules 31 to 33 carried out in manufacturing six units of the product 29 is twelve.

On the other hand, according to the conventional assembly process apparatus 9 shown in FIG. 14 which performs twelve steps consecutively to complete one unit of the product 29 at a time, the number of interchanges of the tool 93 carried out in manufacturing six units of the product 29 is seventy-two, because twelve interchanges are repeated for each six units of the product 29.

Third Embodiment

A third embodiment of the present invention will now be described with reference to FIGS. 12 and 13.

Figure 12:
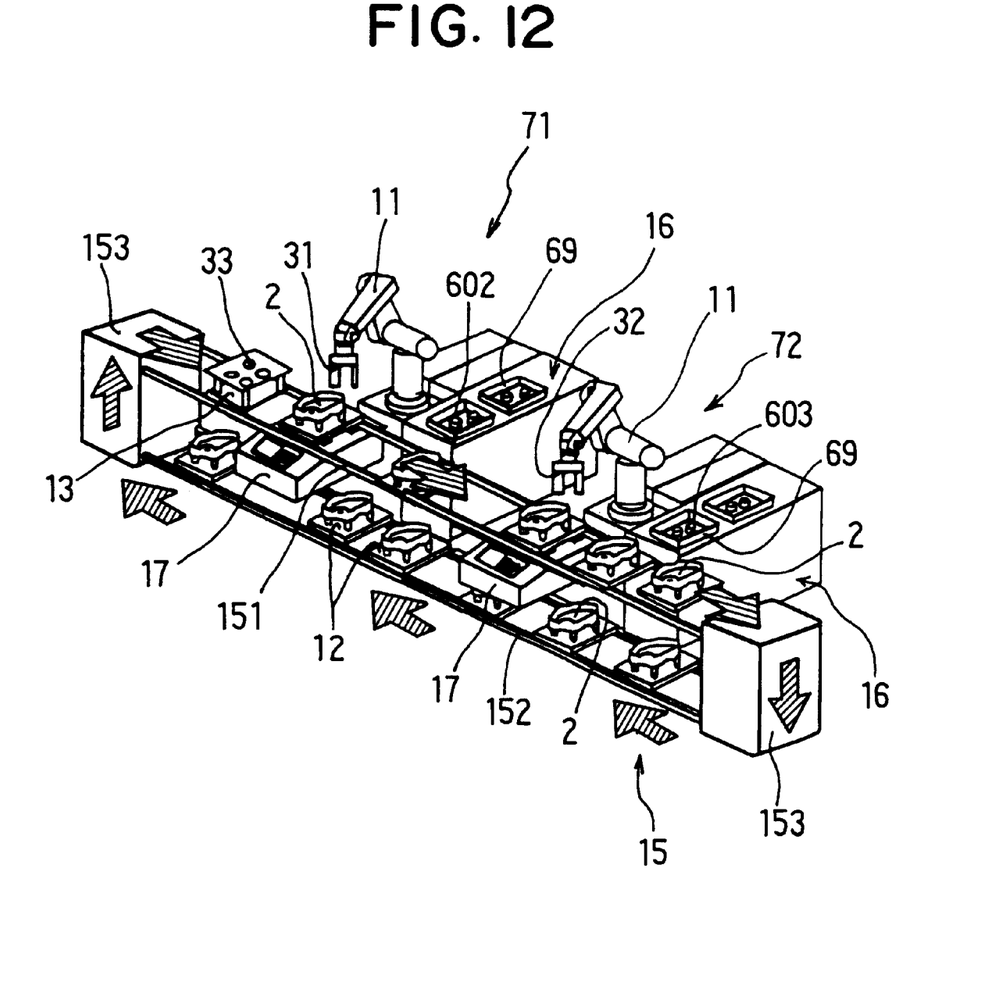
FIG. 12 is a schematic perspective illustration of an assembly process apparatus according to a third embodiment of the present invention.

According to the third embodiment, as shown in FIG. 12, with the assembly process apparatus 1 of the second embodiment as one unit, two units, a first unit 71 and a second unit 72, are combined. Furthermore, by upper rails 151 and lower rails 152 being combined together, the conveyor 15 is made to circulate between the two units successively. The rest is the same as the second embodiment.

According to the third embodiment of the present invention, the tool pallet 13 is circulated by the conveyor 15 successively to the first unit 71 and the second unit 72. During this time, the assembly robots of the units respectively attach to themselves assembly process modules 31, 32 supplied by the tool pallet 13.

Figure 13:
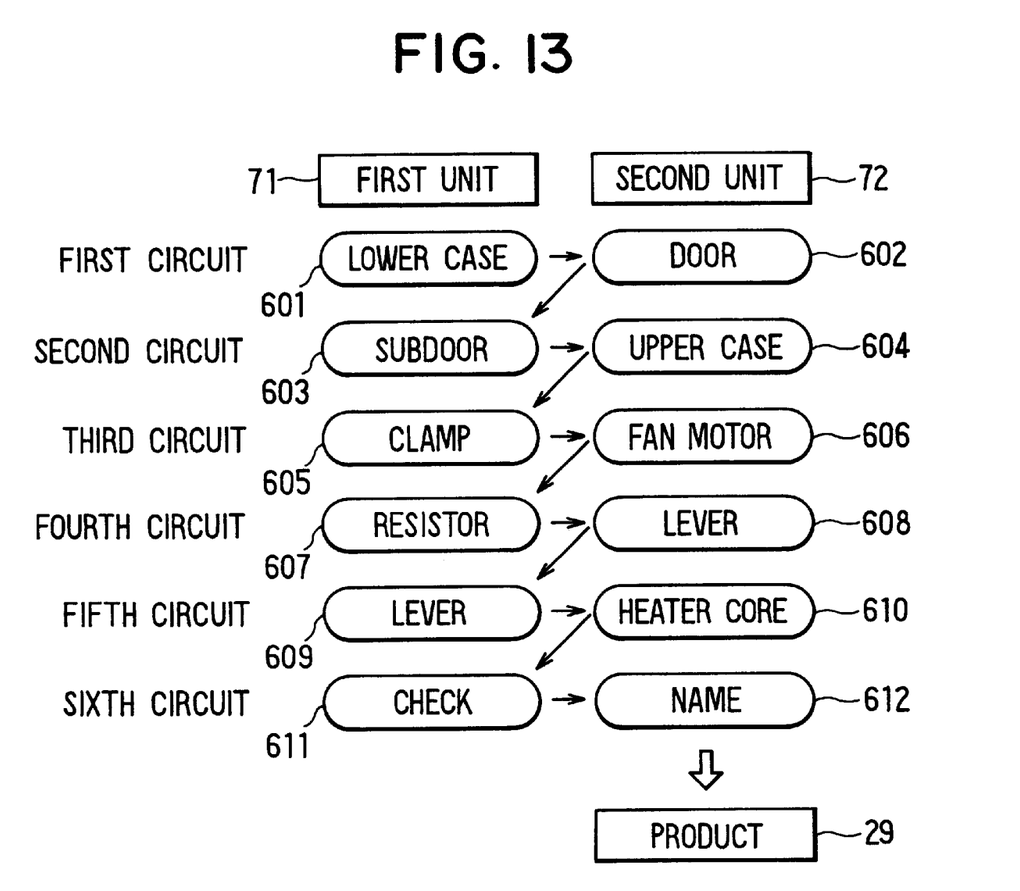
FIG. 13 is an explanatory illustration showing a circuit by circuit assembly sequence according to the third embodiment.

Then, as shown in FIG. 13, first, in a first circuit, the assembly robot 11 of the first unit 71 uses the assembly process module 31 to fix a part 601 for a first step as a workpiece 2 to the work pallet 12 carried thereto after the tool pallet 13. Then, the assembly robot 11 of the second unit 72 uses the assembly process module 32 to assemble a part 602 for a second step to the workpiece 2.

Next, in a second circuit, a subdoor 603 of a third step, and an upper case 604 of a fourth step, and in a third circuit, a clamp 605 of a fifth step, and a fan motor 606 of a sixth step, are assembled. Then, in a fourth circuit, a resistor 607 of a seventh step, and a lever 608 of an eighth step, are assembled, and in a fifth circuit, a lever 609 of a ninth step, and a heater core 610 of a tenth step, are assembled. Then, in a sixth circuit, a check 611 of an eleventh step, and a name 612 of a twelfth step are assembled. Thus, multiple units of the product 29 (see FIG. 8) are completed.

Thus in the third embodiment of the present invention, the first unit 71 repeats odd-numbered steps, and the second unit repeats even-numbered steps.

And, while each work pallet 12 makes one circuit, the number of parts assembled to a workpiece 2 on the work pallet 12 is two steps' worth. By this means, the parts 603 to 612 are assembled to the workpiece 2 by the assembly robots 11 two steps at a time, and multiple units of the product 29 are completed.

According to the third embodiment, with the assembly process apparatus 1 shown in the second embodiment above as one unit, by connecting two units of this, production volume is improved to double, and it is possible to handle an increase in production volume easily. That is, as in the second embodiment, by the work pallets 12 and the tool pallet 13 being circulated, two steps are made to be carried out successively by the assembly robots 11 of the units in one circulation. By this means it is possible to reduce the number of circuits and shorten production time.

According to the second and the third embodiments, with this invention, it is possible to carry out suitable production adjustment by changing the number of the units according to production volume. And when the production volume is reduced, the units having become surplus, or the assembly robots therein, can be transferred to use in other equipment.

Therefore, line equipments can be expanded or reduced easily according to the size of a production volume, suitable running corresponding to production volume can be carried out, and production cost can be made low.

Otherwise, the same effects as the first embodiment can be obtained.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An assembly process apparatus comprising:
   an assembly robot for assembling a plurality of parts to a workpiece in a predetermined order;
   a part supply apparatus having a plurality of part supply modules which are interchangeable with respect to said assembly robot for supplying said parts to said assembly robot in said predetermined order;
   a work pallet for supplying said workpiece to said assembly robot;
   a plurality of assembly process modules which are interchangeable with respect to said assembly robot for assembling said parts to said workpiece;
   a tool pallet for supplying said plurality of assembly process modules to said assembly robot;
   a conveyor for circulating said work pallet and said tool pallet with respect to the assembly robot; and
   a counter for counting a number of circuits of said conveyor to provide information indicating one of said parts to be assembled on the workpiece to said assembly robot.

2. An assembly process apparatus according to claim 1, wherein said assembly process apparatus includes a plurality of said assembly robots and a plurality of said part supply apparatuses.

3. An assembly process apparatus according to claim 1, further comprising:

an assembly indicating device for providing information about one of said parts to be assembled next, the information being defined on the basis of said number of circuits counted by said counter.

4. An assembly process apparatus according to claim 3, wherein said assembly indicating device is disposed in said work pallet for carrying said information.

5. An assembly process apparatus according to claim 1, wherein said counter includes a counter device disposed in said tool pallet for carrying information defined by said number of circuits.

6. An assembly process apparatus for assembling parts, comprising:

a first assembly robot for assembling a first group of said parts to a workpiece in a predetermined order;

a second assembly robot for assembling a second group of said parts to a workpiece in a predetermined order;

a first parts supply module for supplying said first group of said parts to said first assembly robot;

a second parts supply module for supplying said second group of said parts to said second assembly robot;

a plurality of assembly process modules which are attachable to said first and second assembly robots for assembling said parts to said workpiece;

a conveyor for circulating said workpiece and said assembly process modules with respect to said first and second assembly robots; and a counter for counting a number of circuits of said conveyor to provide information indicating one of said parts to be assembled on the workpiece to each of said first and second assembly robots.

7. An assembly process apparatus according to claim 6, wherein:

said assembly process apparatus includes a work pallet for mounting said workpiece thereon; and said work pallet includes an assembly indicating device for providing part assembly information to said first and second assembly robots, said part assembly information being defined on the basis of said number of circuits counted by said counter.

* * * * *